United States Patent
Caviedes (10) Patent No.: US 7,038,710 B2
(45) Date of Patent: May 2, 2006

(54) METHOD AND APPARATUS FOR MEASURING THE QUALITY OF VIDEO DATA

(75) Inventor: Jorge E. Caviedes, Yorktown Heights, NY (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 630 days.

(21) Appl. No.: 10/197,334

(22) Filed: Jul. 17, 2002

(65) Prior Publication Data

US 2004/0012675 A1     Jan. 22, 2004

(51) Int. Cl.
*H04N 17/00* (2006.01)

(52) U.S. Cl. .................. 348/180; 348/189; 455/226.1; 455/115.1; 382/167

(58) Field of Classification Search ................ 348/180, 348/185, 189, 191, 192, 193; 382/167, 255, 382/272, 274, 275; 455/226.1, 226.2, 226.3, 455/115.1, 423
See application file for complete search history.

(56) References Cited

U.S. PATENT DOCUMENTS

| | | | |
|---|---|---|---|
| 5,682,442 A * | 10/1997 | Johnston et al. ............ | 382/239 |
| 5,694,484 A * | 12/1997 | Cottrell et al. .............. | 382/167 |
| 5,835,627 A * | 11/1998 | Higgins et al. ............. | 382/167 |
| 6,239,834 B1 | 5/2001 | Miyaji et al. ............... | 348/193 |
| 6,675,174 B1 * | 1/2004 | Bolle et al. .............. | 707/104.1 |
| 6,731,797 B1 * | 5/2004 | Prentice ...................... | 382/167 |
| 6,847,733 B1 * | 1/2005 | Savakis et al. ............. | 382/225 |

FOREIGN PATENT DOCUMENTS

| | | |
|---|---|---|
| DE | 19521408 | 12/1996 |
| EP | 0827346 A2 | 3/1998 |
| EP | 983025081 | 10/1998 |
| EP | 993071737 | 3/2000 |

* cited by examiner

*Primary Examiner*—John Miller
*Assistant Examiner*—Jean W. Désir (57) ABSTRACT

The present invention relates to a method and apparatus for generating a model used to estimate the quality of input-video data. The apparatus is configured to obtain a plurality of average subjective scores from a plurality of sample video data, and a plurality of image metrics for each of the plurality of said average subjective scores is calculated. Some of the plurality of said image metrics is converted into corresponding, perceived quality metrics, then an image-quality metric is predicted based on the calculated quality metrics and the perceived quality metrics.

24 Claims, 6 Drawing Sheets

| VIDEO TEST SETS | AVERAGE SUBJECTIVE SCORES |
|---|---|
| $V_1$ | $S_1$ |
| $V_2$ | $S_2$ |
| $V_3$ | $S_3$ |
| ⋮ | |
| $V_{100}$ | |
| ⋮ | |
| $V_n$ | $S_n$ |

FIG. 3

| SHARPNESS | | | COMPRESSION | | | POST PROCESSING | | NO COMPRESSION & | | | NOISE & SHARPNESS | | | | | | | | | COMPRESSION & SHARPNESS | | | | NOISE & NOISE REDUCTION | | |
|---|---|---|---|---|---|---|---|---|---|---|---|---|---|---|---|---|---|---|---|---|---|---|---|---|---|
| 0.25 | 0.50 | 0.75 | 1 | 1 | 3 | 5 | 1 | 3 | 5 | 30 | 35 | 40 | 30 | | | 35 | | | 40 | | | 3 | | 5 | | 40 | 35 | 30 |
| | | | | | | | REMOVE BLOCKING | | | | | | 0.25 | 0.50 | 0.75 | 0.25 | 0.50 | 0.75 | 0.25 | 0.50 | 0.75 | 0.25 | 0.50 | 0.25 | 0.50 | | | |
| $S_{11}$ | $S_{12}$ | $S_{13}$ | $S_{14}$ | $S_{21}$ | $S_{22}$ | $S_{23}$ | $S_{31}$ | $S_{32}$ | $S_{33}$ | $S_{41}$ | $S_{42}$ | $S_{43}$ | $S_{51}$ | $S_{52}$ | $S_{53}$ | $S_{61}$ | $S_{62}$ | $S_{63}$ | $S_{71}$ | $S_{72}$ | $S_{73}$ | $S_{81}$ | $S_{82}$ | $S_{83}$ | $S_{84}$ | $S_{91}$ | $S_{92}$ | $S_{93}$ |
| $S_{111}$ | $S_{112}$ | $S_{113}$ | $S_{114}$ | $S_{121}$ | $S_{122}$ | $S_{123}$ | ⋮ | ⋮ | ⋮ | ⋮ | ⋮ | ⋮ | | | | | | | | | | | | | | | | |

FIG. 4

|     | B | R | C | CN | N | SH | GENERAL FUNCTION |
|-----|---|---|---|----|---|----|------------------|
| $S_1$ | $B_1$ | $R_1$ | $C_1$ | $CN_1$ | $N_1$ | $SH_1$ | |
| $S_{11}$ | $B_{11}$ | $R_{11}$ | $C_{11}$ | $CN_{11}$ | $N_{11}$ | $SH_{11}$ | |
| $S_{12}$ | • | • | • | • | • | • | |
| $S_{13}$ | • | • | • | • | • | • | |
| ⋮ | • | • | • | • | • | • | $\Sigma NROQM_{ij}$ $= F(B_{ij}, R_{ij}, C_{ij}, CN_{ij},$ $N_{ij}, SH_{ij})$ |
| $S_2$ | | | | | | | |
| $S_{111}$ | | | | | | | |
| $S_{112}$ | | | | | | | |
| ⋮ | | | | | | | |

METHOD AND APPARATUS FOR MEASURING THE QUALITY OF VIDEO DATA

BACKGROUND OF THE INVENTION

1. Field of the Invention

The present invention relates to a method and apparatus for measuring the quality of video data and, in particular, to a method and system for estimating the quality of pictures without referring to the source video data.

2. Description of the Related Art

It is the ultimate goal of video experts to provide most perceptually appealing video images to viewers. One way to determine whether a resulting image quality is good or poor is to ask a panel of viewers to watch certain video sequences and to give their opinions. Another way to analyze video sequences is to provide an automated mechanism to evaluate the excellence or the degradation of the video quality. To this end, various metrics are used, i.e., sharpness, blocking, ringing, clipping, noise, contrast, and temporal impairments to evaluate the overall video-quality measure. Without an objective quality metric, performing a routine assessment of video quality using formal subjective testing is time-consuming, expensive, and impossible for in-service applications.

Accordingly, the present invention proposes an objective quality assessment for still and coded video capable of measuring improvement and degradation without utilizing the source data.

SUMMARY OF THE INVENTION

The present invention is directed to an apparatus and method for evaluating the quality of video data without the use of a reference image.

According to one aspect of the invention, a method for generating a subjective reference model, which is used to estimate the quality of input-video data is provided. The method includes the steps of: obtaining a plurality of average subjective scores from a plurality of sample video data; calculating a plurality of image metrics for each of the plurality of the average subjective scores; converting at least some of the plurality of the image metrics into corresponding, perceived quality metrics; and, deriving the model based on the plurality of the image metrics and the perceived quality metrics. The subjective reference model is then used to produce an objective quality metric for any given input video data. The average subjective scores obtained by showing the plurality of the sample video data to a plurality of viewers under a predetermined condition; converting each of the plurality of the sample video data into a plurality of processed video data according to predetermined criteria; and, obtaining the average subjective scores based on the plurality of the sample video data and the corresponding processed video data. In the embodiment, the plurality of the sample video data is representative of a wide range of video sequences typically viewed by an average consumer. The plurality of the image metrics comprise at least one of blocking, ringing, clipping, noise, contrast, and sharpness metrics, and the perceived quality metrics comprise at least one of blocking, ringing, clipping, and sharpness perceived metrics.

The foregoing and other features and advantages of the invention will be apparent from the following, more detailed description of preferred embodiments as illustrated in the accompanying drawings in which reference characters refer to the same parts throughout the various views. The drawings are not necessarily to scale; instead the emphasis is placed upon illustrating the principles of the invention.

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
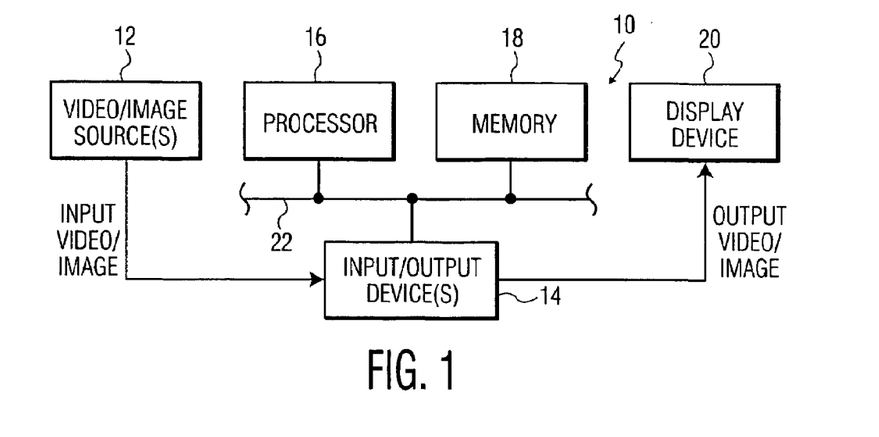
FIG. 1 is a simplified block diagram whereto the embodiment of the present invention is applicable.

FIG. 1 illustrates an image-processing system 10 whereto the embodiment of the present invention may be applicable. As shown in FIG. 1, the system 10 includes one or more video/image sources 12, one or more input/output devices 14, a processor 16, a memory 18, and a display device 20. The input/output devices 14, processor 16, and memory 18 may communicate over a communication medium 22, which may represent, i.e., a bus, a communication network, one or more internal connections of a circuit, circuit card or other device, as well as portions and combinations of these and other communication media. The memory 18 may represent, i.e., disk-based optical or magnetic storage units, electronic memories, as well as portions or combinations of these and other memory devices. Note that various functional operations associated with the image-processing system 10 may be implemented in whole or in part in one or more software programs/signal processing routines stored in the memory 18 and executed by the processor 16. In other embodiments, however, hardware circuitry, such as an application-specific integrated circuit (ASIC), may be used in place of, or in combination with, software instructions to implement the invention.

In addition, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Their function may be carried out through the operation of program logic, through dedicated logic, through the interaction of program control and dedicated logic, or even manually, the particular technique being selectable by the implementer as more specifically understood from the context.

Now, a detailed description of the present invention is explained hereinafter with reference to FIGS. 2 and 5.

As a person of average skill in the art will appreciate, in general, a fundamental task in an objective quality metric is to emulate subjective image quality, which represents the average judgment of a group of viewers in a controlled environment. The subjective image quality is affected by the combined perception of the image features, i.e., impairments and attributes. Accordingly, the present invention provides means to obtain a subjective reference model that may be used to generate an objective quality score indicative of the degradation or enhancement of the input-video images.

Figure 2:
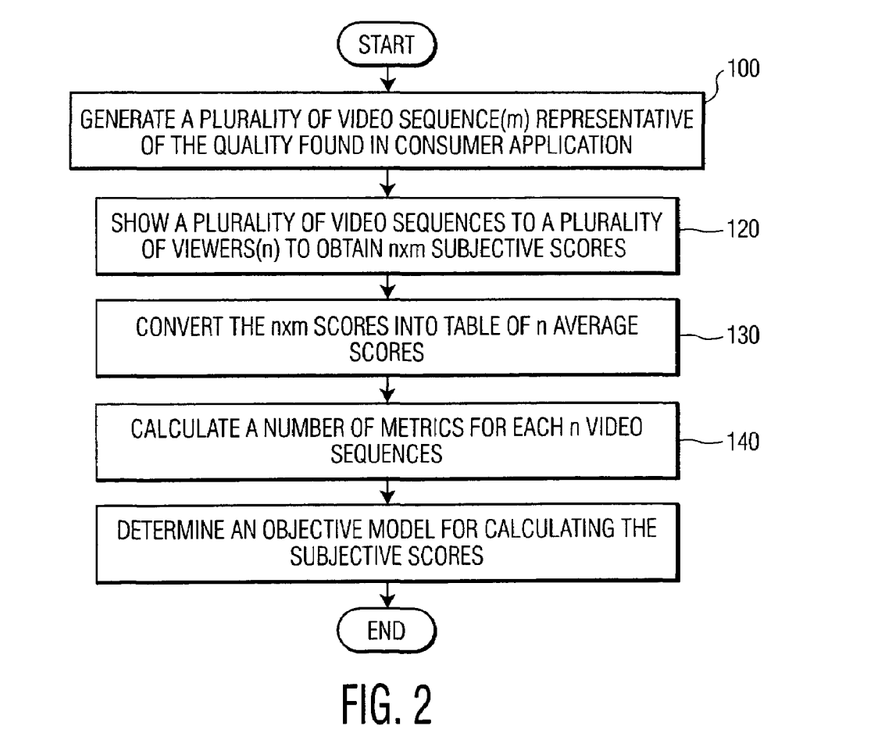
FIG. 2 is a flow chart illustrating the operation steps of obtaining the subjective score reference used to predict the object quality score in accordance with the present invention.
Figure 4:
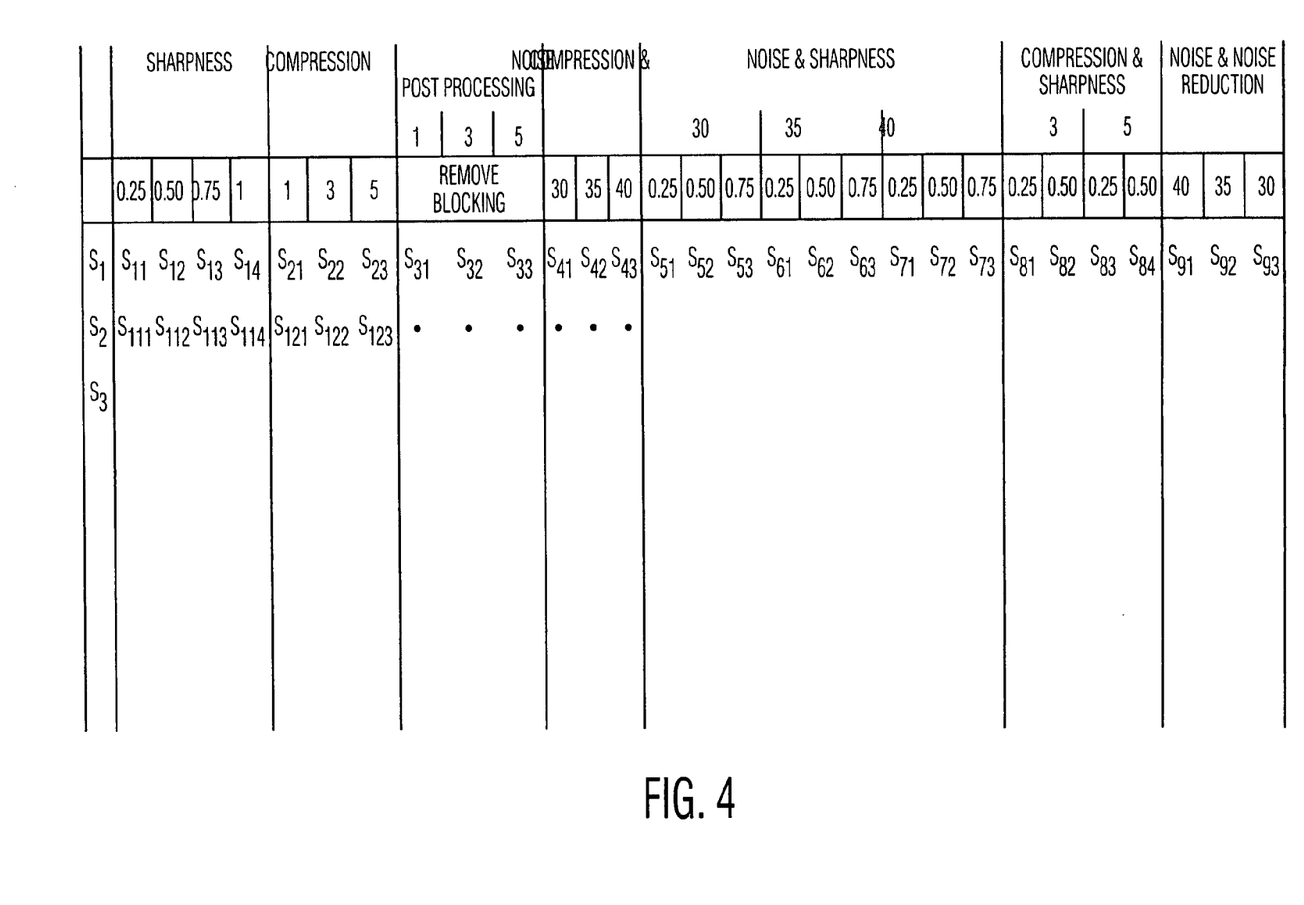
FIG. 4 is another table generated during the process of obtaining the subjective score reference of FIG. 2.

Referring to FIG. 2, the process of generating the subjective reference model, which is used to generate an objective image metric of input-video data, is explained. First, a set of n video sequences representative of what a normal viewer might see in most video applications is generated in step 100. Starting with a set of K original videos (as a person of average skill in the art will appreciate, this means video without impairments or special enhancements, straight from a video capture/generation device), each undergoes a number of different treatments, e.g. L, in which a varying degree of quality contributing factors, such as blockiness, noise, compression, sharpness, enhancement, or in any combination thereof, are applied to convert the video sequence into a number of different video data for rating. For example, as shown in FIG. 4, the video sequence $S_1$ is treated with sharpness set at 0.25, 0.5, 0.75, and 1.0 to produce four different grades of sharpness, then the viewers are asked to view each set of video sequences to obtain an average subjective score of $S_{11}$, $S_{12}$, $S_{13}$, and $S_{14}$. Compression set at 1 Mb/s, 2 Mb/s, and 5 Mb/s bit rates are also performed on the video sequence $S_1$ and the corresponding average subjective scores of $S_{21}$, $S_{22}$, and $S_{23}$ are obtained. Similarly, the same video sequence $S_1$ is also treated with three different levels of bit rates, $S_{31}$, $S_{32}$, $S_{33}$, while removing a specified amount of blockiness at level. Noise, i.e., Gaussian noise, of 30 dB, 35 dB, and 40 dB are further applied to the video sequence $S_1$ and subject to viewing to generate an average subjective score of $S_{41}$, $S_{42}$, and $S_{43}$. The noise at three different levels of 30 dB, 35 dB, and 40 dB is mixed with three levels of sharpness of 0.25, 0.5, and 0.75, then viewed by the viewers to obtain average set values of $S_{51}$, $S_{52}$, $S_{53}$, $S_{61}$, $S_{62}$, $S_{63}$, $S_{71}$, $S_{72}$, and $S_{73}$. Compression at 3 Mb/s and 5 Mb/s with two levels of sharpness of 0.25 and 0.5 generate average scores of $S_{81}$, $S_{82}$, $S_{83}$, and $S_{84}$. Noise and a specified amount of noise reduction are introduced to the video sequence $S_1$ to generate the average subject score of $S_{91}$, $S_{92}$, and $S_{93}$. If we are to generate a total of n test sequences, n is thus equal to K×L, or the number of originals times the number of treatments to generate multiple quality levels. It should be noted that each original video sequence is converted into a specific number of levels as shown in FIG. 4 for illustrative purposes and thus should not impose limitations on the scope of the invention. Accordingly, other combination of conversions is possible according to the teaching of the present invention, thus should not impose limitations on the scope of the invention.

In step 120, the plurality of video sequences is shown to a number of testing viewers (m) to obtain the corresponding average subjective quality scores. Here, a number of viewers, for example 21, is divided into a groups of 3 (i.e. test with three viewers at a time). Then, each group is asked to evaluate a wide range of video sequences and rate them. To increase reliability, the subjective quality scores must be obtained using a repeatable procedure, such as that described in an International Telecommunication Union (ITU) Recommendation 500, the content of which is hereby incorporated by reference. The ITU provides a list of testing conditions to follow when conducting subjective quality scores.

Figure 3:
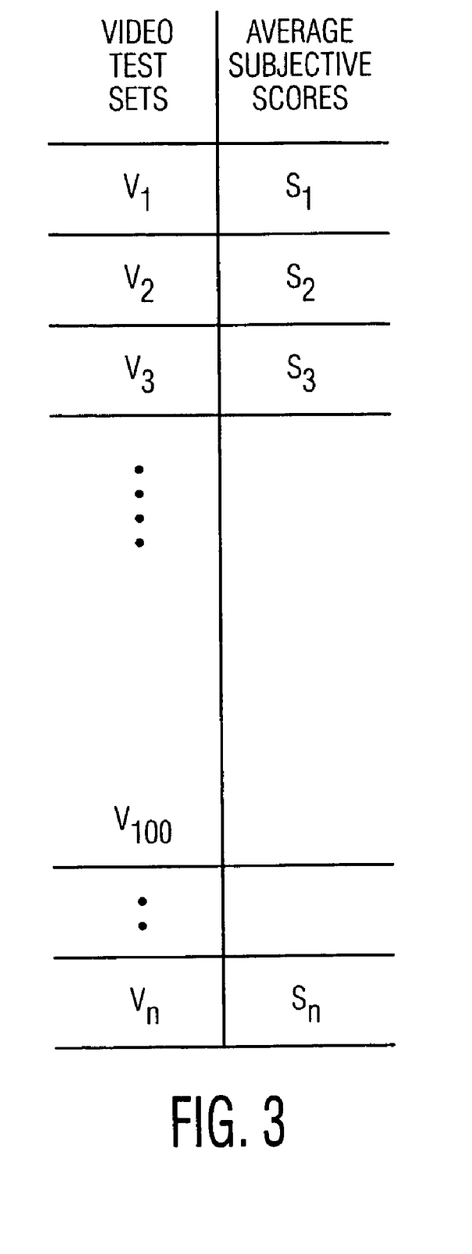
FIG. 3 is a table generated during the process of obtaining the subjective score reference of FIG. 2.

In step 130, average subjective scores for each n video sequence is obtaind. The result will be tabulated, as shown in FIG. 3, wherein $V_n$ represents different video sequences and $S_n$ represents the corresponding average subjective scores obtained from the viewers.

Figure 5:
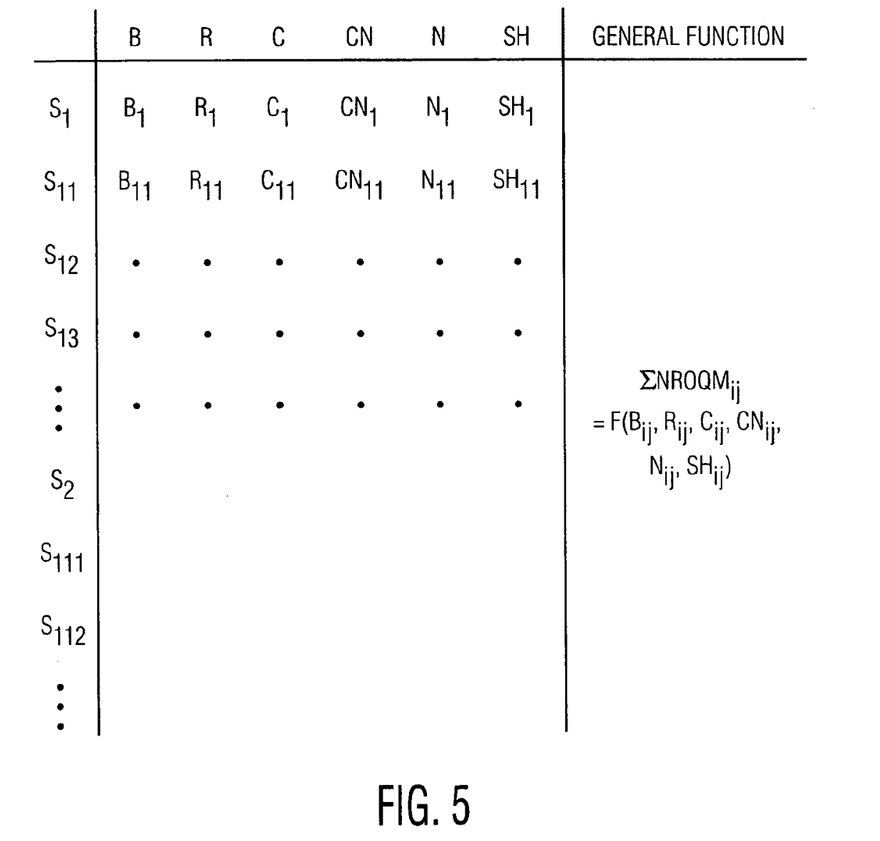
FIG. 5 illustrates the subjective score reference generated according to the operation steps recited in FIG. 2.

In step 140, as shown in FIG. 5, a number of image metrics relating to the impairments and attributes, such as blocking(B), ringing(R), clipping(C), noise(N), contrast (CN), and sharpness(SH), is extracted from each of the n video sequences generated in step 100. As a person of average skill in the art will appreciate, original video input is assumed to have zero impairment and no enhancement after the image-capture procedure. However, video quality at the receiving end suffers due to different factors associated with transmission (i.e., noise), compression (i.e., MPEG artifacts), and image processing (i.e., clipping due to finite precision arithmetic). The set of image features, as shown in FIG. 5, is used to determine an objective quality model that calculates the subjective scores generated in step 130 from all blocking, ringing, clipping, noise, contrast, and sharpness of the input video signals. As a person of average skill in the art will appreciate, if the video sequences generated in step 100 is representative of consumer video quality, the objective quality model will be able to predict the subjective quality of new video sequences not included in that set.

In step 150, based on the image metrics obtained as shown in FIG. 5, the subjective reference model, F, which satisfies the condition for each set of image metrics is obtained (explained later). In the embodiment, the subjective reference model obtained in this way provides a function model that can be used to evaluate the video quality without the availability of a reference-source video signal.

Figure 6:
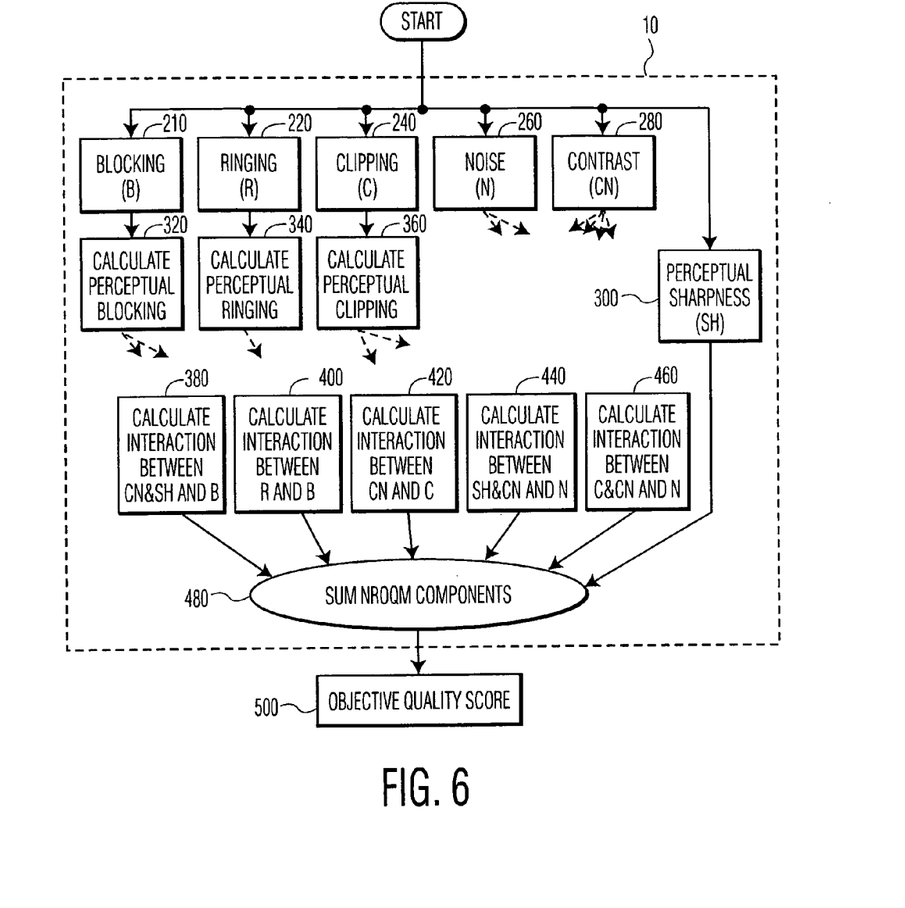
FIG. 6 is a detailed functional block diagram of the image-processing system in accordance with the present invention; and, FIG. 7 is a functional diagram illustrating the process of obtaining an objective quality score component according to a general function derived from the subjective score reference in accordance with the present invention.
Figure 7:
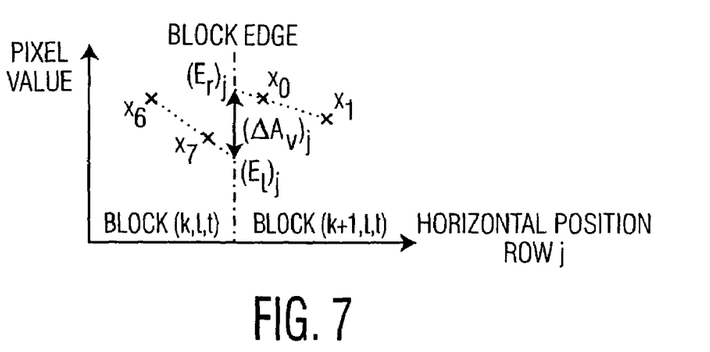

Referring to FIG. 6, the process of deriving the subjective reference model based on the image metrics of step 150 of FIG. 2 is explained. Blocks 210 through 300 represent each of the image metrics shown in FIG. 5. Although calculating each image metric is well known in the art that can be performed in a variety of ways, the characteristics and some exemplary ways to calculate each image metric is briefly explained hereinafter for completeness.

Block 310 represents blocking artifacts (B), which are the result of coarse quantization of DCT coefficients (of 8×8-pixel blocks) in the MPEG coding standard. As one skilled in the art will appreciate, one of the best known MPEG artifacts is the blocking artifact. The amount and visibility of blocking artifacts increases with increased compression, i.e. lower bit rate. Perceived quality of compressed video is strongly affected by blocking artifacts. Blocking artifacts can be measured as the number of 1×8 pixel edges found on the 8×8 grid overlaying the image. Thus, the blockiness is based on the number of vertical and horizontal edges that fall on the most likely coding grid used.

Calculating blocking artifact (B) is well known in the art that can be performed in a variety of ways. For example, one well-known method to measure blocks is by the size of the discontinuity for pixels n and n+1, where n is a multiple of 8 (the grid size). If the discontinuity exists and is lower than the threshold, i.e. 20, then it is on a block edge. If the edge is found in 8 consecutive lines (from line i to i+8), then it is considered a blocking artifact. Another method to quantify the discontinuity is by using the size of the discontinuity of the linear extrapolations of pixels on both sides of the bock. Referring to FIG. 6, let $B(k,l,t)=[x_{klt}(i,j)]_{(i,j)\in[0\ 7]^2}$ be the luminance block of the sequence situated at column k, row l, and time t. As shown in FIG. 6, the value of the artifact between the two blocks B(k,l,t) and B(k+1,l,t) is the discontinuity at the frontier evaluated for the eight lines with the extrapolated values of the neighboring pixels. Accordingly, for each row j of the blocks, extrapolated pixel values are computed according to a first order extrapolator:

$$(E_l)_j = \frac{3}{2}x_{klt}(7, j) - \frac{1}{2}x_{klt}(6, j),$$

$$(E_r)_j = \frac{3}{2}x_{k+1lt}(0, j) - \frac{1}{2}x_{k+1lt}(1, j).$$

Then, the vertical artifact value is the mean of the eight discontinuities:

$$V_m = \frac{1}{8}\sum_{j=0}^{7}(\Delta A_v)_j = \frac{1}{8}\left|\sum_{j=0}^{7}((E_r)_j - (E_l)_j)\right|.$$

Block 320 represents the ringing artifact (R), which is the second best known MPEG artifact. Unlike the blocking, which depends on the presence of uniform or smooth regions, ringing depends on the amount of edges in the image. Ringing is detected as the count of single pixels with high values (causing local variance to be above a certain threshold), if those pixels are near strong edges or in unnaturally smooth regions (mainly found in synthetic video like cartoons). Thus, ringing is a shimmering effect around high contrast edges, and depending on the orientation it manifests itself as edge doubling.

Measuring ringing artifacts (R) is well known in the art that can be performed in a variety of ways. For example, one algorithm to detect and measure ringing includes the following steps:
1. Detect strong edges using a high threshold for the edge transitions.
2. Detect regions adjacent to strong edges where the variance is very low (low activity regions).
3. Pixels where the local variance (computed using as few as two neighboring pixels, usually in one direction) is large are detected as ringing pixels. For example, if the local variance for nearby pixels in a low activity region is 3, then the local variance for a ringing pixel must be at least four times that value. The following conditions can be used:

$$(\sigma_{v(i,j)}>3.)\hat{\ }(\sigma_{v(i,j)}\geq 4.abs(Y_{i-1,j}-Y_{i+1,j}))$$

or $$(\sigma_{h(i,j)}>3.)\hat{\ }(\sigma_{v(i,j)}\geq 4.abs(Y_{i,j-1}-Y_{i,j+1}))$$

where $\sigma_{v,h}$ is the luminance difference between pixel $Y_{i,j}$ and its neighbor $Y_{i+1,j}$
4. The sum of all ringing pixels on the image is the ringing value.

Block 340 represents the clipping artifacts (C). Clipping is a truncation in the number of bits of the image values (luminance and chrominance components) imposed by the arithmetic precision of the process being used. It results in a limited range of values, thus reducing the dynamic range, leading to loss of detail or introduction of artifacts in high contrast regions. However if the extreme values are beyond the limits of the dynamic range, saturation occurs and the pixels are clipped (i.e., pixels take maximum/minimum values of 255 or 0 for the 8 bit precision case). The clipping measurement is a function of the number of clipped pixels found in the image. The clipping metric is defined as 0.0 when no pixels are clipped and 1.0 when 1% or more of the pixels are clipped. A 5% margin is applied to the image on the left, right, top and bottom to avoid counting any blanking or black bars, as well as to speed up the measurement.

Calculating clipping (C) is well known in the art that can be performed a variety of ways. For example, the clipping measurement algorithm may be performed by testing every pixel on the image except the 5% margin on top, bottom, left, and right. Then, if the pixel value is 0 or Max (i.e. 255 if the precision is 8 bits) we increase the count of clipped pixels. When the count is finished, we divide by the total number of pixels in the image (excluding the margins) to obtain the count as a percentage. The percentage of clipped pixels is turned into a clipping metric using the following rule: if 0%, clipping is 0; if less than 1%, clipping is equal to the percentage; and, if 1% or more, then clipping is 1.0.

Block 360 represents the noise artifact (N). Noise is most noticeable in smooth regions or regions with smooth transitions. It gives the subjective impression that the image is not clean, or that something unintended is superimposed on the image. Noise is thus a random variation in spatial or temporal dimension, which appears to varying degrees in video images as a result of random processes linked to the transmission and generation of images. In some cases, very small amounts of noise add to the naturalness of textures (in contrast with a plastic or synthetic appearance) and have been found to increase perceived quality. Most noise, however, obscures details and reduces quality of the visual information.

Calculating noise (N) is well known in the art that can be performed a variety of ways. For example, a typical algorithm would consist of the following steps:
1. Divide the image into small blocks.
2. Measure the intensity variations for every block.
3. Assuming that the intensity of the noise is much smaller in magnitude than the signal, the block with the least variation (or the average of the blocks with the smallest variation) should correspond to a constant brightness region.
4. Use a set of high-pass filters or a band-pass filter to filter out the DC component. The sum of the outputs of the filters is used to compute the variance or noise.

The filters employed in the algorithm are given below:
1. [−0.13,−0.32,−0.64,−0.77,−0.58,−0.13,0.58,1.22,1.54, 1.22,0.58,−0.13,−0.58,−0.77,−0.64,−0.32,−0.13]
2. [0.05,0.15,0.24,0.05,−0.63,−1.02,−0.44,0.82,1.56,0.82, −0.44,−1.02,−0.63,0.05,0.24,0.15,0.05]
3. [0.0,0.0,−0.08,0.0,0.47,0.0,−1.17,0.0,1.56,0.0,−1.17,0.0, 0.47,0.0,−0.08,0.0,0.0]
4. [0.0,0.0,0.0,0.03,−0.20,0.59,−0.59,−0.62,1.58,−0.62, −0.59,0.59,−0.20,0.03,0.0,0.0,0.0]

Accordingly, the image with each of the filters at each pixel and the resultant output is obtained (except for the 8 border pixels on either side in each line). The output is clipped using a clipping function, which ensures that only the noise, which contributes perceptually, is counted. The clipping function used is:

$$\text{clip}(x) = \begin{cases} 0 \to \text{if } (x < ThresholdLow) \\ x \to \text{if } (x > ThresholdHigh) \\ \left(\frac{(x - ThresholdLow) * ThresholdHigh}{(ThresholdHigh - ThresholdLow)}\right) \to \text{otherwise} \end{cases}$$

The clipping function thresholds are derived from Watson's model of perception threshold. The model is described by the following equation:

$$Y(f) = 10^{0.466(\log(f)+0.4)^2 - 0.31}$$

The clipping threshold of any filter is given by:

$$Th = \int Y(f) S(f) df$$

where S(f) is the spatial spectrum response of the filter. f is a normalized version of the spatial frequency f in the previous equation, which compensates for the viewing distance. The clipped responses are averaged over each window of the m windows of the lowest variation. The average, of m such responses, is the noise measure we get from a particular filter. The total noise measure of the algorithm is computed as the sum of the noise measures of the four filters.

Block 380 represents the contrast artifact (CN). Contrast is the difference between the luminance of pixels of interest and the background, and contrast sensitivity is the ability to distinguish objects from the background. Calculating contrast (CN) is well known in the art that can be performed a variety of ways. For example, a basic algorithm to measure contrast is as follows: First, the luminance histogram of the image excluding a 5% margin on the left, right, top and bottom is computed. Second, the upper and lower parts of the histogram that contain each 5% of the total energy are separated. Finally, the difference between the luminance of the upper and lower parts of the histogram normalized by, i.e. divided by, the maximum luminance in the histogram is calculated.

Block 400 represents the sharpness metric, which can be measured by the definition of edges in the spatial domain, or by the characteristics of the high frequencies in the transformed domain. Applicants have filed a U.S. application Ser. No. 10/172,416, on Jun. 14, 2002, which discloses a new way of calculating sharpness metric based on the local edge kurtosis, thus the common subject matter relating to calculating the sharpness metric is hereby incorporated by reference. Briefly, the sharpness metric takes into account spatial and local frequency information and uses the weighted kurtosis of 8×8 blocks enclosing the image edges. As a result, the sharpness metric exhibits high correlation with perceived sharpness, i.e., quality changes affected only by sharpness. Therefore, using the method disclosed in the corresponding U.S. application Ser. No. 08/846,982, a perceptual sharpness metric can be determined.

With continued reference to FIG. 4, after determining the respective metric as described above, blocks 320~360 are performed to modify some of the metric output into a perceptual metric. From a simulation, the values of ringing and blockiness compared to the subjective scores of a set of compressed video sequences reveals that the subjective scores are the highest for sequences coded at bit rates above 5–8 Mb/s, and that those sequences show small amounts of ringing and blockiness. Although sometimes they are correlated, blocking and ringing are independent artifacts and must be accounted for separately. The dependency between quality and blocking and/or ringing is not linear (i.e., the perceptual effect on quality is likely to be a logarithmic or exponential function). When both are present, the combined effect of blocking and ringing are not linearly additive. Moreover, the relative proportion of ringing and blockiness is not constant; sometimes blockiness is dominant, sometimes ringing is dominant. As such, there is a need to transform blockiness/ringing into perceived quality units as well as accounting for their combined perceived effect on quality. The perceptual function applied to each feature can be a simple change from a linear to logarithmic or polynomial form, or the application of a function found to correlate well with subjective data (plus constant factors used for scale normalization). Accordingly, blocks 320~360 are performed, such that the perceptual function for blockiness (B), ringing (R), and noise (N) is the square root (a scaling factor of 40 is also used), and for clipping it is the value times 2.5 plus one, raised to the power of 1.5.

After transforming the blockiness, ringing, and clipping into perceived quality units, blocks 380~460 are executed to account for their combined perceived effect on quality. This process can be represented mathematically as follows:

Block 380: $-\left(1 + CN + \dfrac{SH}{5}\right)\dfrac{B^{1/2}}{40}$,

Block 400: $-\left(1 + CN + \dfrac{SH}{5}\right)\dfrac{\dfrac{B}{(1+B)} R^{1/2}}{40}$ Block 420: $-(1 + CN)(1 + 2.5C)^{3/2}$ Block 440: $-2(N)(SH)(CN)$ Block 460: $-\dfrac{\left(\dfrac{N}{CN}\right)^{1/2}}{(1 + 2.5C)^2}$ Block 500: $+SH$ In step 480, the NROQM includes all the interactions or in any combination when determining an objective quality score to obtain a high correlation with subjective scores. The NROOM can be expressed mathematically as follows:

$NROQM(B, R, C, N, CN, SH) =$ (1a)
$-\left(1 + CN + \dfrac{SH}{5}\right)\dfrac{B^{1/2}}{40}$ $-\left(1 + CN + \dfrac{SH}{5}\right)\dfrac{\dfrac{B}{(1+B)} R^{1/2}}{40}$ (1b)

$-(1 + CN)(1 + 2.5C)^{3/2}$ (1c)

$-2(N)(SH)(CN)$ (1d)

$-\dfrac{\left(\dfrac{N}{CN}\right)^{1/2}}{(1 + 2.5C)^2}$ (1e)

$-(0.6 + CN)^2$ (1f)

$+SH$ (1g)

As shown above, the NROQM includes the following interactions:

Facilitation effect of contrast and sharpness on blockiness and ringing, which accounts for increased visibility of those artifacts (see first term in parts 1a and 1b of the equation above);

Masking effect between blocking and ringing, which makes ringing more noticeable when there is low blockiness (see second term of 1b);

Facilitation effect of contrast on clipping, which makes clipping more noticeable if contrast is high (see term (1+CN) in 1c;

Facilitation effect of sharpness and contrast on noise (see 1d);

Masking effect of clipping and contrast on noise, which avoids weighing noise too heavily in the presence of clipping, which is influenced by contrast (see 1e).

Note that sharpness (1g) is the only positive term in equation 1, and as it is a measure of perceptual sharpness it stands by itself. The term 1f is used to reduce the (small) baseline of contents with contrast above 0.4. This term should disappear if a no-baseline contrast metric is used, but the terms that account for contrast interaction must remain. Also, in that case a positive term for contrast may be included.

In an alternate embodiment, the metrics for motion artifacts can further improve the overall performance of the NROQM. The temporal impairment feature is composed of a weighted sum of at least 3 of the following:

Energy difference in successive frames (in low motion cases it indicates artifacts);

Judder (unnatural modulation of otherwise smooth motion, caused by frame rate conversion);

IBP drift (a difference between I frame and previous one, caused by motion-estimation errors which increase in the B and P frames between two I frames or GOP);

Motion field smoothness standard deviation of the motion vectors (motion vectors indicate change of position of objects from one image to the next, low standard deviation indicates smooth motion);

Mosquito noise (noise around stationary edges, calculated as sum or absolute frame differences among pixels in a small neighborhood around an edge pixel)

In view of the above, the alternate NROQM function can be expressed as:

$$NROQM_{opt} = NROQM(B,R,C,N,CN,SH) + F(MOT) + G(CN),$$

where F(MOT) represents the weighted sum of motion impairments, and G(CN) represents a content-independent contrast metric.

Referring to FIG. 6, once the general function model is obtained, it can be implemented in a system, which may include a television, a set-top box, a desktop, laptop or palmtop computer, portable video telephone, a personal digital assistant (PDA), a video/image storage device such as a video cassette recorder (VCR), a digital video recorder (DVR), a TiVO device, a conventional video processing system, etc., as well as portions or combinations of these and other devices, to evaluate the quality of input data without the use of input data.

As is apparent from the foregoing, the present invention has an advantage in that the image metric system 10 provides a quality metric NROQM that yields a high correlation with subjective scores, without the use of the source reference data. In the prior art, utilizing the original video as a reference was not applicable to in-service quality monitoring and the development of a continuous quality-control system. Thus, the teaching of the present invention can benefit many video applications, such as the focus control of the video imager, video-processing algorithm development, real-time video quality monitoring/control, and real-time quality control of the networked video.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A method for generating a subjective reference model used to estimate the quality of input-video data, the method comprising the steps of:

obtaining a plurality of average subjective scores from a plurality of sample video data comprising the steps of
providing the plurality of said sample video data to a plurality of viewers under a predetermined condition;
converting each of the plurality of said sample video data into a plurality of processed video data according to predetermined criteria; and,
obtaining said average subjective scores based on the plurality of said sample video data and the corresponding said processed video data;

calculating a plurality of image metrics for each of the plurality of said average subjective scores;

converting at least some of the plurality of said image metrics into corresponding, perceived quality metrics; and, deriving said model based on the plurality of said image metrics and said perceived quality metrics.

2. The method of claim 1, further comprising the step of applying said subjective reference model to said input-video data to produce an objective quality metric.

3. The method of claim 1, wherein the converting step further comprises the step of modifying sharpness, compression, noise, and blocking of the plurality of said sample video data or in any combination thereof.

4. The method of claim 1, wherein said predetermined condition complies with an International Telecommunication Union (ITU) Recommendation 500.

5. The method of claim 3, wherein the plurality of said sample video data is representative of a wide range of video sequences typically viewed by an average consumer.

6. The method of claim 1, wherein the plurality of said image metrics comprise at least one of blocking, ringing, clipping, noise, contrast, and sharpness metrics.

7. The method of claim 1, wherein said perceived quality metrics comprise at least one of blocking, ringing, clipping, and sharpness perceived metrics.

8. The method of claim 1, wherein the step of deriving said subjective reference model further comprising the step of computing a combined perceived effect between said calculated image metrics and said perceived image metrics.

9. The method of claim 8, wherein the step of computing said combined perceived effect comprises the step of calculating an interaction between a contrast metric, a perceived sharpness metric, and a perceived blocking metric measured from at least some of the plurality of said image metrics.

10. The method of claim 8, wherein the step of computing said combined perceived effect includes the step of calculating an interaction between a perceived ringing metric and a perceived blocking metric measured from at least some of the plurality of said image metrics.

11. The method of claim 8, wherein the step of computing said combined perceived effect includes the step of calculating an interaction between a contrast metric and a perceived clipping metric measured from at least some of the plurality of said image metrics.

12. The method of claim 8, wherein the step of computing said combined perceived effect includes the step of calculating an interaction between a perceived sharpness metric, a contrast metric, and a noise metric measured from at least some of the plurality of said image metrics.

13. The method of claim 8, wherein the step of computing said combined perceived effect includes the step of calculating an interaction between a perceived clipping metric, a contrast metric, and a noise metric measured from at least some of the plurality of said image metrics.

14. An apparatus for generating a subjective reference model used to estimate the quality of input video data, comprising:
   a processor;
   a memory, coupled to said processor, said memory being configured to allow the processor to:
   obtain a plurality of average subjective scores from a plurality of sample video data by;
      providing the plurality of said sample video data to a plurality of viewers under a predetermined condition;
      converting each of the plurality of said sample video data into a plurality of processed video data according to predetermined criteria; and,
      obtaining said average subjective scores based on the plurality of said sample video data and the corresponding said processed video data calculate a plurality of image metrics for each of the plurality of said average subjective scores;
   convert at least some of the plurality of said image metrics into corresponding perceived quality metrics; and,
   derive said subjective reference model based on the plurality of said image metrics and said perceived quality metrics.

15. The apparatus of claim 14, wherein said memory is further configured to allow said processor to apply said subjective reference model to said input-video data to produce an objective quality metric.

16. The apparatus of claim 14, wherein to convert each of the plurality of said sample video data into the plurality of said processed video data according to said predetermined criteria, said memory is further configured to allow said processor to modify the sharpness, compression, noise, and blocking of the plurality of said sample video data or in any combination thereof.

17. The apparatus of claim 14, wherein the plurality of said image metrics comprise at least one of blocking, ringing, clipping, noise, contrast, and sharpness metrics.

18. The apparatus of claim 14, wherein said perceived quality metrics comprise at least one of blocking, ringing, clipping, noise, contrast, and sharpness-perceived metrics.

19. The apparatus of claim 14, wherein said memory is further configured to allow said processor to compute a combined perceived effect between said calculated image metrics and said perceived image metrics.

20. The apparatus of claim 14, wherein said memory is further configured to allow said processor to calculate an interaction among a contrast metric, a perceived sharpness metric, and a perceived blocking metric measured from at least some of the plurality of said image metrics.

21. The apparatus of claim 19, wherein to compute said combined perceived effect, said memory is further configured to allow said processor to calculate an interaction between a perceived ringing metric and a perceived blocking metric measured from at least some of the plurality of said image metrics.

22. The apparatus of claim 19, wherein to compute said combined perceived effect, said memory is further configured to allow said processor for an interaction between a contrast metric and a perceived clipping metric measured from at least some of the plurality of said image metrics.

23. The apparatus of claim 19, wherein to compute said combined perceived effect, said memory is further configured to allow said processor to calculate an interaction between a perceived sharpness metric, a contrast metric, and a noise metric measured from at least some of the plurality of said image metrics.

24. The apparatus of claim 19, wherein to compute said combined perceived effect, said memory is further configured to allow said processor to calculate an interaction between a perceived clipping metric, a contrast metric, and a noise metric measured from at least some of the plurality of said image metrics.

* * * * *